United States Patent
Kaes et al.

(10) Patent No.: US 8,393,458 B2
(45) Date of Patent: Mar. 12, 2013

(54) RAILING GUIDE

(75) Inventors: Roland Kaes, Moosham (DE); Thomas Wollny, Niedergebraching (DE); Thomas Lehner, Geisling (DE); Robert Wagner, Dieterskirchen (DE)

(73) Assignee: Krones AG (DE)

( * ) Notice: Subject to any disclaimer, the term of this patent is extended or adjusted under 35 U.S.C. 154(b) by 249 days.

(21) Appl. No.: 12/741,190

(22) PCT Filed: Nov. 4, 2008

(86) PCT No.: PCT/EP2008/064899
§ 371 (c)(1),
(2), (4) Date: May 3, 2010

(87) PCT Pub. No.: WO2009/059953
PCT Pub. Date: May 14, 2009

(65) Prior Publication Data
US 2010/0258409 A1    Oct. 14, 2010

(30) Foreign Application Priority Data

Nov. 6, 2007  (DE) .................... 10 2007 052 733

(51) Int. Cl.
*B65G 21/20*    (2006.01)
(52) U.S. Cl. ................... 198/452; 198/836.1
(58) Field of Classification Search ............ None
See application file for complete search history.

(56) References Cited

U.S. PATENT DOCUMENTS

| | | | |
|---|---|---|---|
| 3,325,131 A | 6/1967 | Englander et al. ........... 248/251 |
| 4,470,499 A | 9/1984 | Sijbrandij .................... 198/836 |
| 4,958,725 A | 9/1990 | Meade et al. ............... 198/836.1 |
| 5,316,134 A | 5/1994 | Donohue .................... 198/861.1 |
| 5,803,687 A | 9/1998 | Ledingham ..................... 411/85 |

(Continued)

FOREIGN PATENT DOCUMENTS

| | | |
|---|---|---|
| DE | 70 44 014 | 11/1970 |
| DE | 24 39 804 | 3/1976 |

(Continued)

OTHER PUBLICATIONS

European Search Report issued in EP11167217 dated Sep. 5, 2011 (7 pages).

(Continued)

*Primary Examiner* — Kavel Singh
(74) *Attorney, Agent, or Firm* — Hayes Soloway P.C.

(57) ABSTRACT

A guide arrangement for guiding moving containers, includes at least one guide element which extends in a predefined extension direction at least in some sections along the transport path of the containers, and at least one holding device which holds the guide element at a predetermined position relative to the transport path. The holding device has a clamp element which clamps the guide element, wherein the clamp element bears against the guide element in a direction perpendicular to the extension direction, and the guide element has in its cross-section two holding sections and a wall section which is formed between these holding sections and in one piece with these holding sections, wherein these holding sections are curved at least by 90° and an outer circumference of the holding sections is in contact with the clamp element at least in some sections, and the guide element has a recess which is formed by the wall section and the hold sections and by which a further guide device can be held.

8 Claims, 6 Drawing Sheets

U.S. PATENT DOCUMENTS

| | | | | |
|---|---|---|---|---|
| 6,053,654 | A | 4/2000 | Ledingham | 403/306 |
| 6,076,655 | A | 6/2000 | Marsetti | 198/445 |
| 6,105,757 | A | 8/2000 | Ledingham | 198/836.3 |
| 7,850,000 | B2 * | 12/2010 | Andreoli | 198/836.1 |
| 2005/0011728 | A1 | 1/2005 | Ledingham | 198/453 |

FOREIGN PATENT DOCUMENTS

| | | |
|---|---|---|
| DE | 76 31 052 | 1/1977 |
| DE | 27 13 223 | 10/1977 |
| DE | 31 16 334 | 11/1982 |
| DE | 91 05 736.1 | 7/1991 |
| DE | 94 10 612 | 8/1994 |
| DE | 296 10 201 | 1/1997 |
| DE | 101 18 566 | 10/2002 |
| DE | 698 22 715 | 3/2005 |
| EP | 1 905 708 | 4/2008 |
| EP | 1 961 680 | 8/2008 |
| EP | 1905708 A3 | 1/2009 |
| JP | 7-300217 | 11/1995 |
| WO | WO 98/18697 | 5/1998 |
| WO | WO 03006347 | 1/2003 |
| WO | WO 2009/059953 | 5/2009 |

OTHER PUBLICATIONS

Chinese Search Report issued in Appln. No. 2008801157277, Post No. 2011080200678050, dated Aug. 5, 2011 (3 pgs).

Chinese Office Action, dated Dec. 8, 2011 (13 pgs).

German Search Report, 10 2007 052 733.2, dated Nov. 15, 2007, (4 pgs).

European Office Action issued in related application 11167217.6, dated May 18, 2012 (4 pgs).

Notice under Article 94 (3) EPC issued in the parallel European divisional patent application, no translation available dated Oct. 18, 2012 (3 pages).

Chinese Office Action issued in related application 2008801157277, dated Jun. 29, 2012 (15 pgs).

* cited by examiner

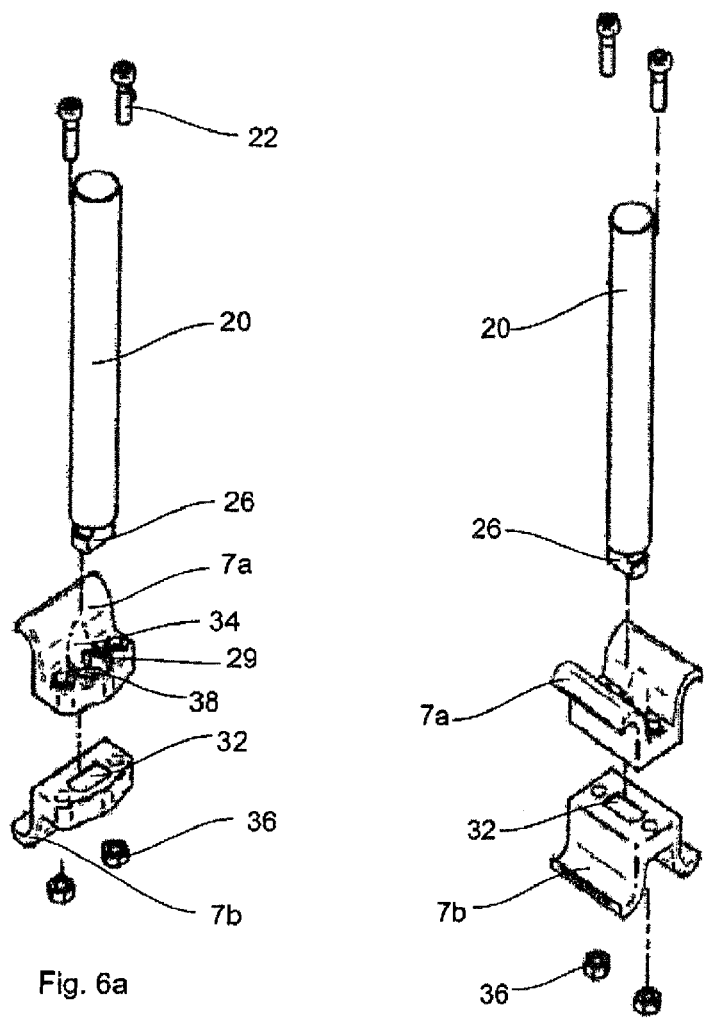
Fig. 6a
Fig. 6b
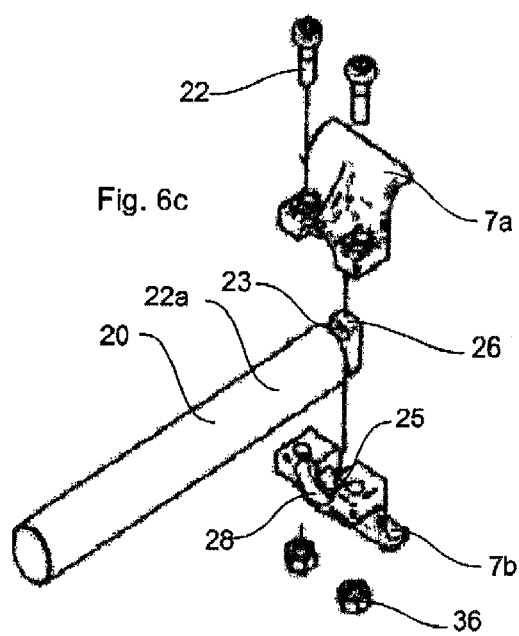
Fig. 6c

RAILING GUIDE

BACKGROUND OF THE INVENTION

The present invention relates to a guide arrangement and more specifically to a guide railing for guiding moving containers. In the beverage-producing industry, transport belts which transport for example containers or else beverage crates or boxes and the like are used at many locations. In order to ensure lateral guidance at these transport belts, guide belts or guide railings are provided, along which the respective containers are transported. Depending on the respective containers, different rails are used, for example metal profiles, plastic profiles, profiles with rolling bodies and the like. These various railings are configured differently in each case.

A large number of different railing guides are known from the prior art. U.S. Pat. No. 3,325,131 describes a device for mounting railings. In this case, a railing with a semicircular cross-section is pushed into a guide device. DE 101 18 566 A1 discloses a holding device for a lateral guide of a continuous conveyor. In this case, a lateral guide which is composed of a plurality of rectilinear wall sections is held by the holding device.

DE 296 10 201 U1 describes a railing for a container conveyor. In this case, a holding clamp is provided which holds the railing. U.S. Pat. No. 6,105,757 discloses a guide system. This comprises a holding clamp in which a guide railing with rectilinear side faces is held.

DE 91 05 736 U1 describes a wear profile for guide railings in container conveying devices. Here too, a clamp is provided which clamps a guide element, wherein this guide element itself forms the actual guide device of the railing. DE 27 13 223 likewise discloses a railing guide. In this case, the actual railing is introduced into a guide clamp.

DE 24 39 804 A1 describes a guide railing for container conveyors. In this case, a guide element is carried centrally by a holding arm.

SUMMARY OF THE INVENTION

The objection of the present invention is to provide a guide arrangement which can be used in a versatile manner, that is to say for different types of container. The intention is for it to be possible to use the same basic elements in each case and to adapt only individual components of the guide arrangement. Furthermore, it should be preferably also be possible to hold a number of guide elements using one holder.

A guide arrangement according to the invention for guiding moving containers comprises at least one guide element and in particular a lateral guide element which extends in a predefined extension direction at least in some sections along the transport path of the containers, and at least one holding device which holds the guide element at a predetermined position relative to the transport path. According to the invention, the holding device has a clamp element which clamps the guide element, wherein the clamp element bears against the guide element in a direction perpendicular to the extension direction, and the guide element has in its cross-section two holding sections and a wall section which is formed between these holding sections and in one piece with these holding sections, and wherein the holding sections are curved at least by 90° and an outer circumference of the holding sections is in contact with the clamp element at least in some sections, and the guide element has a recess which is formed by the wall section and the holding sections and in which a further guide device can be received.

The transport path of the containers is understood to mean the path along which the containers are conveyed. A clamp element is understood to mean an element which contacts another element from two sides and preferably from two opposite sides and thus preferably clamps it. The direction perpendicular to the extension direction is preferably a direction which is perpendicular not only to the extension direction but also to the plane of a transport belt. Bearing in this perpendicular direction is understood to mean in particular that the clamp element bears against the guide element from above and below and thus in the direction pointing from top to bottom.

The cross-section of the guide element is understood to mean a cross-section in a cross-sectional plane which is perpendicular to the extension direction. The holding sections serve in this case to hold a further guide device, and the wall section located therebetween preferably runs in a rectilinear manner. The curvature by at least 90° may in this case be a curvature in the shape of a circle or a arc of a circle, but a different, for example elliptical, curvature by 90° would also be possible, or even a curvature composed of a plurality of rectilinear sections which are angled relative to one another.

These holding sections of the guide element are in contact with the clamp element in some sections, that is to say the holding of the guide element relative to the clamp element takes place at least also via a holding between the clamp element and said holding sections. In particular a further guide device, such as a plastic body for example, can be introduced into said recess which is formed by the wall section and the holding sections.

In a further advantageous embodiment, at least one holding section is symmetrical in relation to a plane parallel to the wall section. Preferably, both holding sections are formed symmetrically in relation to the plane parallel to the wall section. By virtue of this symmetrical shape of the curvature, the guide element can be introduced into the clamp element both in such a way that the recess projects outwards, that is to say in the direction of the containers to be conveyed, and in such a way that the recess projects inwards, that is to say away from the containers. In this way, the wall section itself on the one hand can be used as a guide body and on the other hand in the reverse position can form a guide device inserted in the recess.

Such a procedure is not possible for example in the case of some of the devices known in the prior art, since the guide element in those cases can be inserted into the clamp element only in one direction. Preferably, the holding sections have a curvature of more than 100°, preferably more than 120°, preferably more than 140° and particularly preferably in a range of 160°-180°, but preferably the curvature is also no greater than 180°. In one particularly preferred embodiment, the two holding sections have a semicircular profile and are connected to one another by a wall section running in a rectilinear manner.

In a further advantageous embodiment, the clamp element has a C-shaped profile. In one preferred embodiment, the guide element also has a C-shaped profile but, as mentioned, the wall section of the guide element is preferably rectilinear.

In a further advantageous embodiment, the clamp element clamps the guide element by means of two fixing sections located opposite one another, wherein these fixing sections are curved by a smaller angle than the holding sections of the guide element. By means of this curvature this curvature, which is smaller and at most of equal size, it is achieved that the guide element can be comfortably received in the holding sections. More specifically, the guide element can be pushed into the clamp element both in its longitudinal direction and also from the front after slightly loosening the clamp element beforehand. Preferably, an outer profile of the guide element is adapted to an inner profile of the clamp element. This means that both the holding sections of the guide element and the fixing sections have a corresponding contour, for example both have a cross-section in the shape of a segment of a circle.

In a further preferred embodiment, a width of the outer circumference of the guide element is larger than a width of the inner circumference of the clamp element. This means that the guide element always protrudes beyond the holding device and the clamp element regardless of its arrangement in the clamp element. This prevents containers from butting directly against the clamp element during transport.

Preferably, a further guide device is arranged in the recess of the guide element. With particular preference, this is a guide device which is made from plastic. In this case, this guide device is configured in such a way that it protrudes outwards relative to the guide element, that is to say in the direction of the containers. In this way, the containers will in this case not butt against the guide element during transport, but rather only against the guide device.

In a further advantageous embodiment, the further guide device comprises a plurality of rotatable bodies. As mentioned above, the guide arrangement according to the invention is intended to be suitable, when equipped accordingly, for a large number of different containers. If, as in this case, the guide device comprises a plurality of rotatable bodies, for example in the form of plastic rollers, it is particularly preferably suitable for example for so-called disposable shrink packs. Instead of plastic rollers, plastic balls may also be provided as rotatable bodies. If, as mentioned above, the guide device is a plastic profile, it is suitable for example for disposable and reusable boxes. Use of the guide element alone, for example by turning the guide element around relative to the clamp element, may be suitable for containers in the form of bottle crates.

In a further advantageous embodiment, the holding device comprises a carrier, on which the clamp element is releasably arranged in a fixed position. This may be for example a rod-shaped carrier, on which the clamp element is arranged via engagement means.

The present invention also relates to a holding device for holding a guide element for guiding moving containers. In this case, the holding device comprises a clamp element for holding the guide element and a carrier on which this clamp element is arranged. According to the invention, the clamp element comprises a first clamp part and a second clamp part which cooperates with this first clamp part in order to hold the guide element, and also at least one connection element, by means of which the two clamp parts can be releasably connected to one another, wherein the clamp parts have a receiving region for receiving an end section of the carrier in such a way that the end section of the carrier can be received between the clamp parts and clamped between the clamp parts in a non-rotatable manner.

The holding device is understood to mean a device which holds the guide element at a predetermined position relative to a transport belt for example. As mentioned above, the clamp parts serve to clamp the guide element, wherein they clamp the guide element preferably from above and below. Screws, nuts and the like may be provided for example as the connection element for connecting the two clamp parts.

Preferably, two such connection elements are provided and the end section of the carrier is arranged between these two connection elements in the assembled state.

By virtue of the releasable arrangement, it is possible quickly to replace or to turn around the guide element. Also by virtue of this measure, a larger strip width on different guide arrangements can be produced using simple means.

Preferably, the carrier is a rod-shaped body. In a further advantageous embodiment, the carrier has a first engagement means which cooperates with a second engagement means of at least one clamp part. In this case, it is possible that the carrier has a protrusion which engages in a matching groove of the clamp part. Conversely, however, the carrier may also have a groove, in which there engages a protrusion or a circumferential collar of the clamp part or parts.

In a further advantageous embodiment, an engagement body with a non-circular cross-section is provided on an end section of the carrier. By virtue of this non-circular cross-section, it is possible to fix or lock a certain rotary position of the carrier relative to the clamp parts. In this case, preferably this engagement body is spaced apart from the other regions of the carrier by a circumferential groove.

In a further preferred embodiment, at least one clamp part and preferably just one clamp part has an opening, through which a section of the carrier can pass. In this case it is possible that this opening is adapted in such a way that only the engagement body can pass through it, but not a main body of the carrier. In a further advantageous embodiment, the two clamp parts are configured in such a way that in the assembled state they form an opening, in which the carrier is held. Preferably, this opening in the clamp part is a closed opening. Preferably, the carrier can pass through this opening only in a certain rotary position.

In a further advantageous embodiment, at least one clamp part has a recess, the geometric shape of which is adapted to a cross-section of an end section of the carrier. More specifically, this recess is adapted to an end section of the engagement body. During assembly, the engagement body can be latched into this recess and then the two clamp elements can be screwed to one another.

The present invention also relates to a guide arrangement of the type described above comprising at least one holding device of the type described above. In the holder according to the invention, it is possible in one preferred embodiment that the bolt or carrier latches into the two holding devices as a result of rotation and in this way the guide device or the railing is clamped and thus easy mounting is possible. By virtue of the design according to the invention, it is possible to provide a standardised main carrier which is preferably produced from stainless steel. This main carrier or this profile can be used both for an outer railing and for a central railing. By contrast, in the prior art, different profiles are used as the main carrier, depending on whether an outer railing or a central railing is desired. The main carrier and guide elements also differ in the prior art according to the outer area and central area, which makes production more expensive.

As mentioned above, the shape of the guide element is such that a wide range of guide possibilities is available for rapid exchange, such as rollers, plastic guide rails or even the guide element alone.

BRIEF SUMMARY OF THE DRAWINGS

Further advantages and embodiments will emerge from the appended drawings:

In the drawings:

FIG. 6a shows a holding device with a vertical carrier and a single clamp element;

FIG. 6b shows a holding device with a vertical carrier and a double clamp element;

FIG. 6c shows a holding device with a horizontal carrier and a clamp element;

DETAILED DESCRIPTION OF THE INVENTION

Figure 1A:
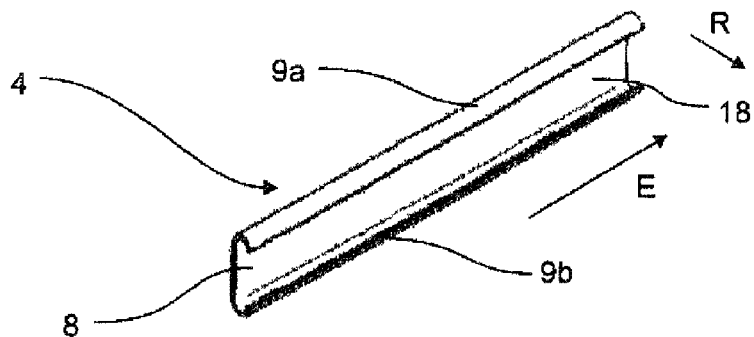
FIGS. 1a-1d show different embodiments of a guide element, in some cases with a guide device.
Figure 1B:
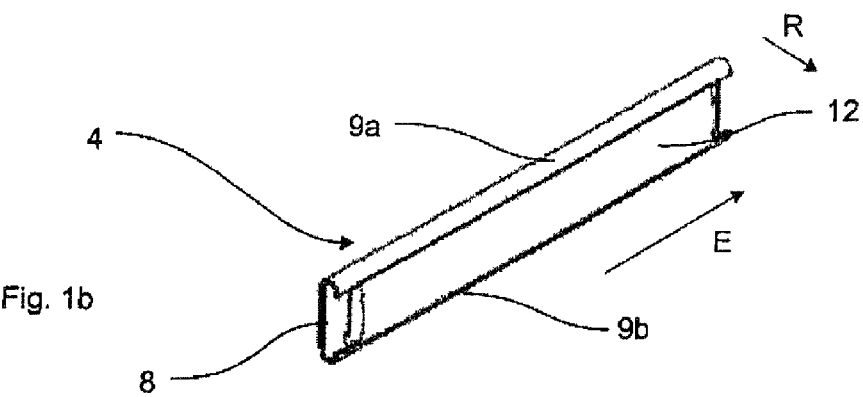
Figure 1C:
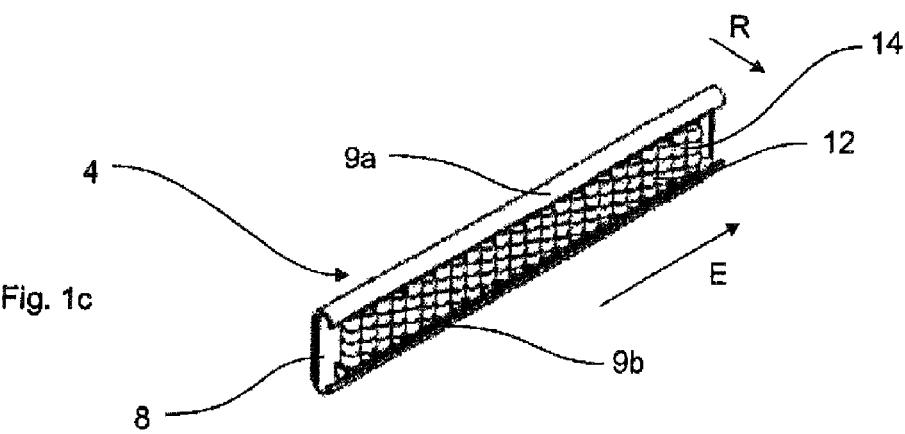

FIGS. 1a-1c show a guide element 4 in different embodiments. FIG. 1a shows the guide element without an insert. This guide element has a first holding section 9a and a second holding section 9b located opposite the first, wherein a wall section 8 is provided between these two holding sections 9a, 9b. Here, this wall section runs in one plane and extends in an extension direction E of the guide element. By virtue of this wall section 8 and the two holding sections 9a and 9b, a recess 18 is formed, into which further guide devices can be inserted.

This guide element can be used alone, for example for transporting bottle crates.

FIG. 1b shows the guide element of FIG. 1a, wherein here a guide device 12 in the form of a plastic profile 12 is inserted in the recess 18. This plastic profile 12 protrudes from the guide element 4 and/or from the holding sections 9a and 9b in the direction R. Furthermore, the guide device 12 is configured in such a way that it engages at least partially behind the two holding sections 9a and 9b.

As can be seen in particular from FIGS. 1a and 1b, the two holding sections 9a and 9b have a curvature, wherein here there is a substantially circular curvature which has an angle of approximately 180°. The guide element shown in FIG. 1b is particularly suitable as a transport railing for disposable and reusable boxes.

FIG. 1c shows a guide element, wherein here the guide device 12 comprises a plurality of plastic rollers 14. This outer circumference of the plastic rollers also protrudes from the guide element 4 in the direction R. This embodiment is particularly suitable for transporting disposable shrink packs.

Figure 1D:
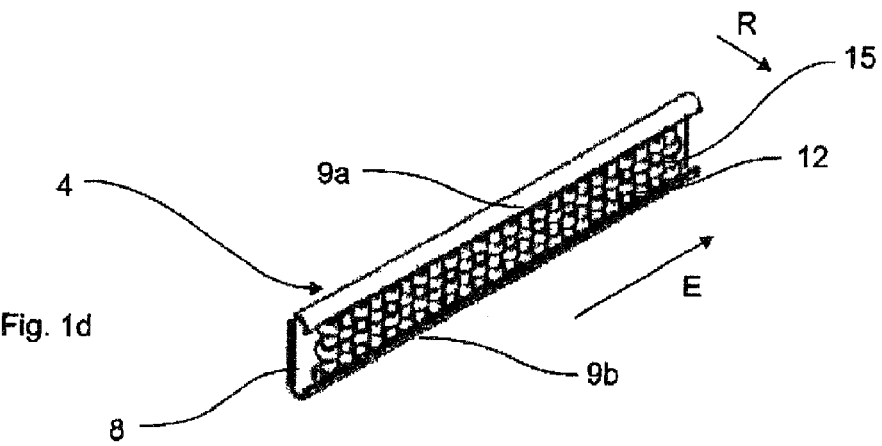

FIG. 1d shows a further embodiment of a guide element 4a. Here too, a C-shaped profile of the guide element is provided, and also a guide device comprising a plurality of plastic balls 15. This guide element is also particularly suitable for disposable shrink packs. It can be seen that the different guide devices, which are configured in particular in the form of plastic inserts, can in each case be used on the same guide element 4.

Figure 2A:
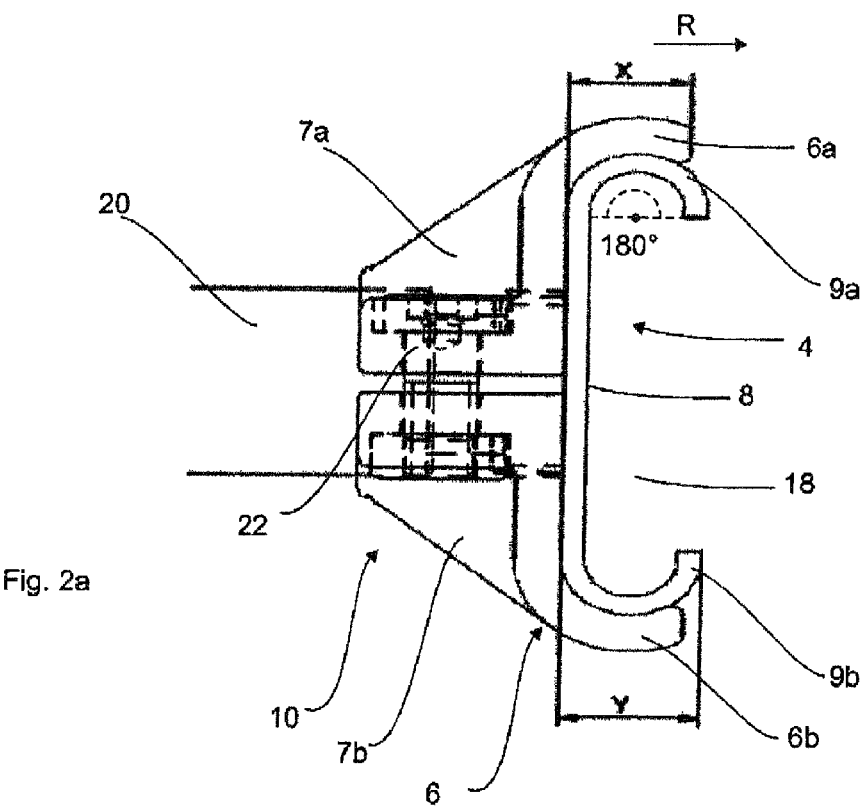
FIG. 2a shows a side view of a guide arrangement with an inserted guide element.

FIG. 2a shows a side view of a guide arrangement according to the invention. Said guide arrangement comprises a carrier 20, onto which two clamp parts 7a and 7b are screwed by means of a screw 22. These clamp parts 7a and 7b in turn form a clamp element 6; more specifically, this clamp element is formed of two clamp sections 6a and 6b. The guide element 4 is arranged within these clamp sections 6a and 6b. It can be seen that the outer width Y of the holding section 9b or 9a is larger than the inner width X of the clamp element 6.

In this way, the guide element always protrudes from the holding element 6 in the direction R. In this way, a plastic profile inserted in the guide element 4 in FIG. 2a also always protrudes from the holding element 6 and in this way it is possible to prevent transported piece goods from butting directly against the clamp element 6 during transport.

In the embodiment shown in FIG. 2a, the two holding sections 9a and 9b are curved by 180° as mentioned above. The holding sections 6a and 6b also have a curvature, but here the angle of curvature is less than 180°, but preferably also greater than 90°. Such an angle of curvature means that the guide element 4 is held on the one hand and on the other hand also protrudes from the holding element 6 in the direction R.

Figure 2B:
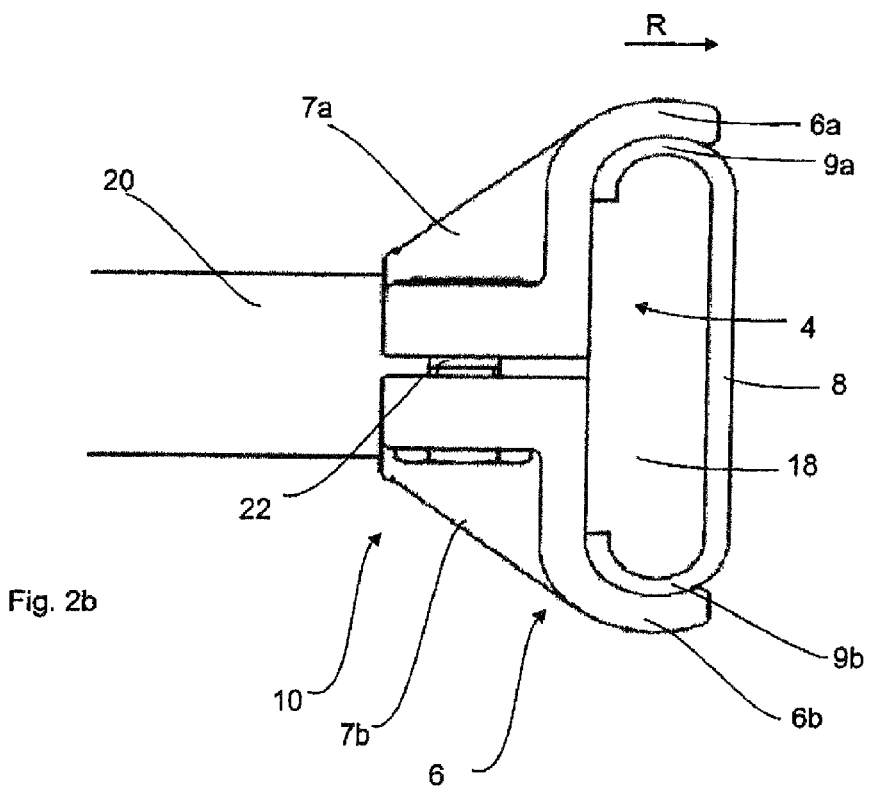
FIG. 2b shows a view of a guide arrangement with the guide element inserted the other way round.

FIG. 2b shows a further arrangement of the guide element. It can be seen here that merely the guide element 4 has been rotated through 180° in the plane of the figure. In this way, the guide element 4 or the wall section 8 thereof can be used directly as a railing for piece goods. By comparing the diagrams shown in FIGS. 2a and 2b, it is possible to see that a wide range of guide railings can be formed using a small number of components. In the embodiment shown in FIG. 2b, the recess 18 does not play any role since it is turned inwards.

Figure 3A:
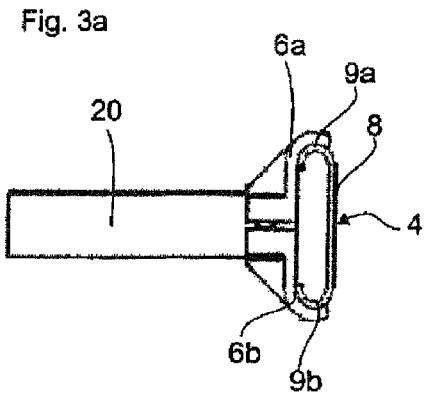
FIGS. 3a-3c show a guide arrangement with a horizontal holder.
Figure 3B:
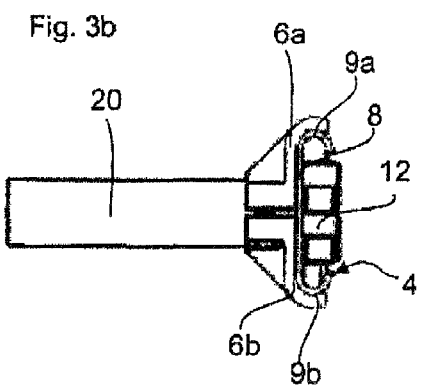
Figure 3C:
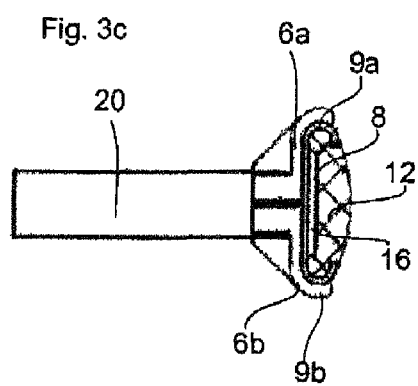

FIGS. 3a-3c show different embodiments of a holding arrangement. In each case a carrier 20 is provided, on which the holding sections 6a and 6b and also the guide element with its holding sections 9a and 9b are arranged. In the embodiment shown in FIG. 3a, the guide element is turned in a manner similar to that in FIG. 2a, so that the wall section 8 points outwards. In the embodiment shown in FIG. 3b, a guide device 12 comprising rolling bodies is inserted. In the embodiment shown in FIG. 3c, a guide device 12 without rollers is inserted, wherein this guide device 12 has protrusions 14 which are adapted to the inner cross-section of the holding sections 9a and 9b, and by means of which this guide device 12 is held.

Furthermore, in this embodiment, a gap 16 is provided between the guide device and the wall section 8, wherein this guide section brings about a certain spring capability of the guide device 12 relative to the guide element 4.

Figure 4A:
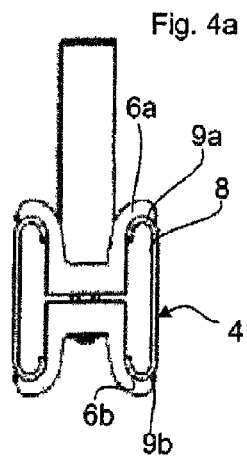
FIGS. 4a-4c show a guide arrangement with a double holder.
Figure 4B:
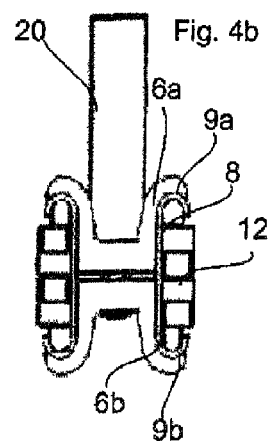
Figure 4C:
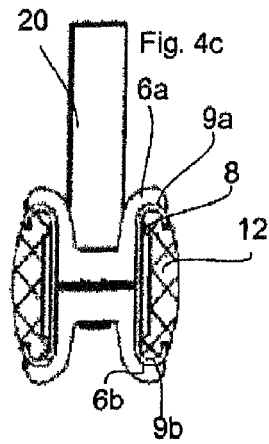

FIGS. 4a-4c show a corresponding embodiment for a double holder. Here, the carrier 20 is arranged vertically and two holding sections 9a and 9b pointing in different directions with the respective guide elements 4 are arranged on the carrier. This arrangement is suitable in particular for transport paths on which piece goods are conveyed on both sides of the railing. Once again, in a manner corresponding to the embodiment shown in FIGS. 3a-3c, different arrangements of the guide element and different guide devices are conceivable.

Figure 5A:
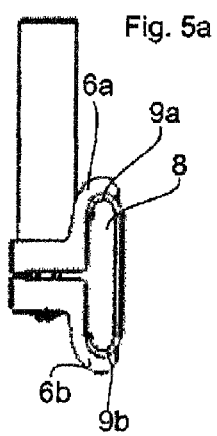
FIGS. 5a-5c show a guide arrangement with a vertical holder.
Figure 5B:
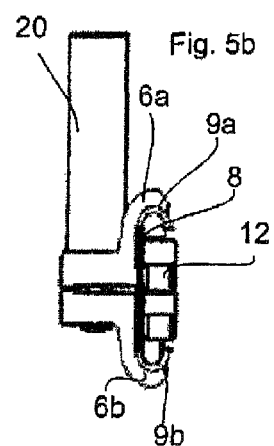
Figure 5C:
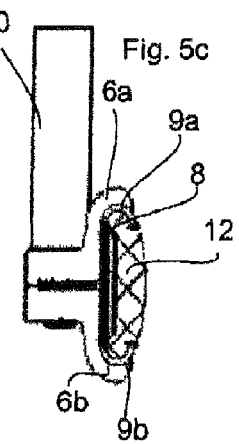

FIGS. 5a-5c show a further embodiment with a vertically arranged carrier 20 but just one one-sided guide element.

As can be seen from FIGS. 3a-5c, in each case a standardised main carrier is used, which is preferably produced from stainless steel. This profile can be used both for an outer railing and for a central railing. By contrast, in the prior art, different profiles are presently used as the main carrier.

By virtue of the arrangement according to the invention and the shape of the carrier device, a wide range of guide possibilities is thus available for rapid exchange, such as rollers or plastic guide rails or even, as shown above, the guide element alone.

For constructing a guide arrangement, a number of the components shown in FIGS. 3a-5c can also be combined with one another, for example a double holder with a single holder and a holder with a horizontal carrier. In this way, modular railings can be constructed on the whole.

FIG. 6a shows the assembly of a holder with a vertically oriented carrier 20. Provided on this carrier 20 is a protrusion 26 which has a non-circular cross-section and in this case in particular a rectangular cross-section. This protrusion or bolt can be pushed into an opening 38 of the clamp part 7a. In this case, it can preferably be pushed in only in one particular rotary position. A recess 34 is also provided, along which the main body of the carrier 20 can be guided.

The second clamp part 7b has a recess 32, the surface area of which is adapted to an end face of the protrusion 26. During assembly, firstly the carrier in FIG. 6a is rotated through 90°, so that it can be passed through the accordingly matched opening 38. After it has been passed through, the carrier is once again rotated through 90°, so that the protrusion 26 engages in the recess 32. In this state, the two clamp elements 7a and 7b are screwed to one another using the screws 22 and the nuts 36 and in this way a stable holding of the carrier relative to the clamp elements 7a and 7b is brought about. A collar 29 prevents the carrier 20 from being able to pass back out of the opening 38 and thus the clamp part 7a in this rotary position.

FIG. 6b shows a further arrangement, wherein here a double holding element is provided. In a manner similar to the embodiment shown in FIG. 6a, the carrier here is also firstly rotated through 90° in order then ultimately, after passing through the opening (not shown here), to latch with its end face in the recess 32. The two clamp elements 7a and 7b can then again be screwed to one another using screws 22 and nuts 36.

FIG. 6c shows a holding arrangement, wherein here the carrier 20 is arranged horizontally. In this embodiment, the carrier is inserted into a recess 28 in such a way that a collar 25 engages in a groove 23 formed between the protrusion 26 of the carrier and the main body 20a of the carrier. The second holding element 7a is then placed on and the two holding elements are screwed to one another using the screws 22 and the nuts 36. Here too, a stable hold of the carrier relative to the holding elements 7a and 7b is possible.

It can be seen that in all the embodiments a standardised carrier 10 having a standardised protrusion 26 can be used, which overall reduces the production costs for the railing.

Figure 7:
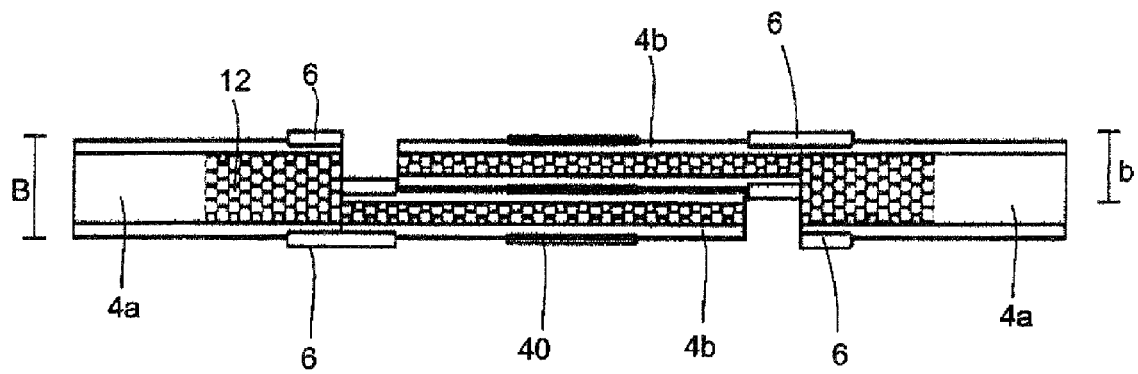
FIG. 7 shows one possible structure for a railing.

FIG. 7 shows a diagram to illustrate a modular construction for a railing. Here, two guide elements 4a having a larger width B and two further guide elements 4b having a smaller width b are provided. Accordingly, the clamp elements 6 also have different widths for receiving these guide elements 4a, 4b. Via the two central guide elements 4b having the smaller widths b and the clamp elements 6 arranged at the edge sides thereof, the two outer guide elements 4a having the large widths B are connected to one another. At the same time, it can be seen that the distance between the two outer guide elements can be achieved by displacing the two inner guide elements 4b having the small width b towards one another.

Figure 8:
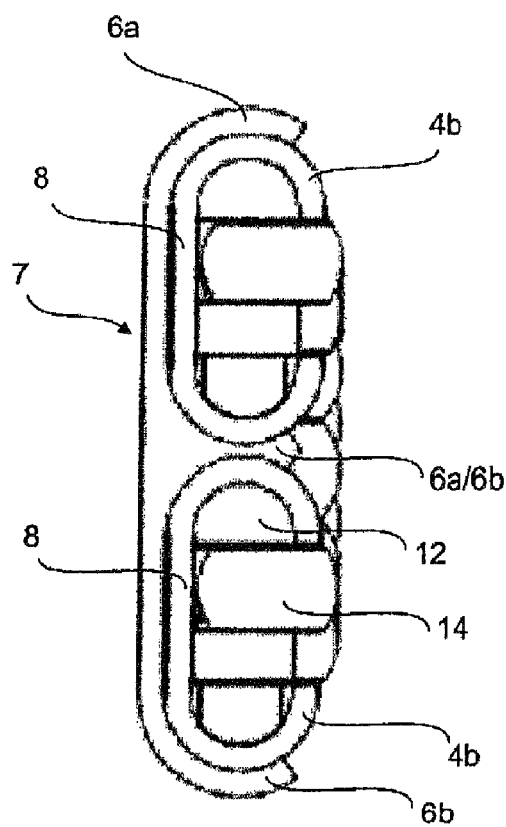
FIG. 8 shows a side view of a holding device with two clamp elements.

Reference 40 denotes the central holder shown in FIG. 8, on which the two guide elements 4b having the small width b are arranged. This central holder 40 has an upper clamp section 6a and a lower clamp section 6b. Arranged between these two clamp sections 6a, 6b is a central web which fulfils the function of the two clamp sections 6a, 6b. The two guide elements 4 are arranged between the individual holding elements, wherein in this embodiment a displacement of these two guide elements 4b towards one another in a direction perpendicular to the plane of the figure is possible.

Figure 9:
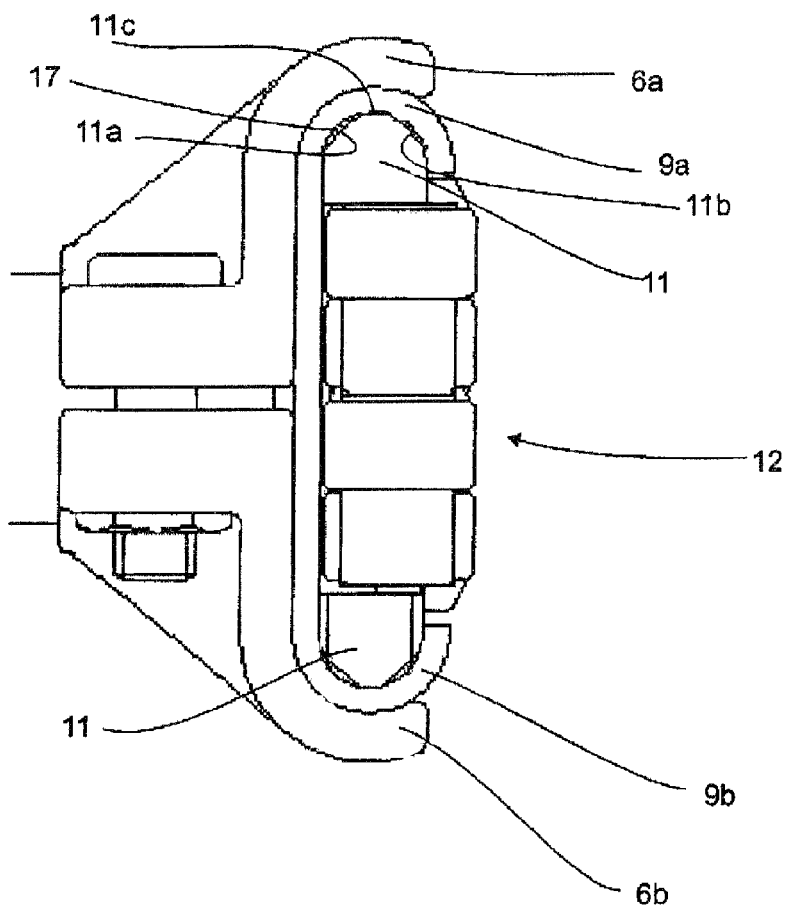
FIG. 9 shows an enlarged view of a guide arrangement with an inserted guide element.

FIG. 9 shows an enlarged view of the guide element also shown in FIG. 3b with the inserted guide device 12. It can be seen that the guide device 12 has two engagement means 11 which respectively engage in the recesses formed by the holding sections 9a, 9b. The contour of these engagement means 11 is advantageously designed for the stability of the inserted guide device 12. More specifically, the engagement means 11 have two obliquely running side sections 11a and 11b and an end section 11c which runs horizontally in FIG. 9.

By virtue of the end section 11c and the corresponding end section on the lower engagement means 11, the guide device completely fills the guide element 4 in the vertical direction and in this way the stability is increased.

Recesses or free areas 17 are formed between the two side sections 11a and 11b on the one hand and the guide element 4 on the other hand. These free areas 17 serve the purpose that the guide device 12 can be better introduced into the shaped or curved guide element 4.

Figure 10:
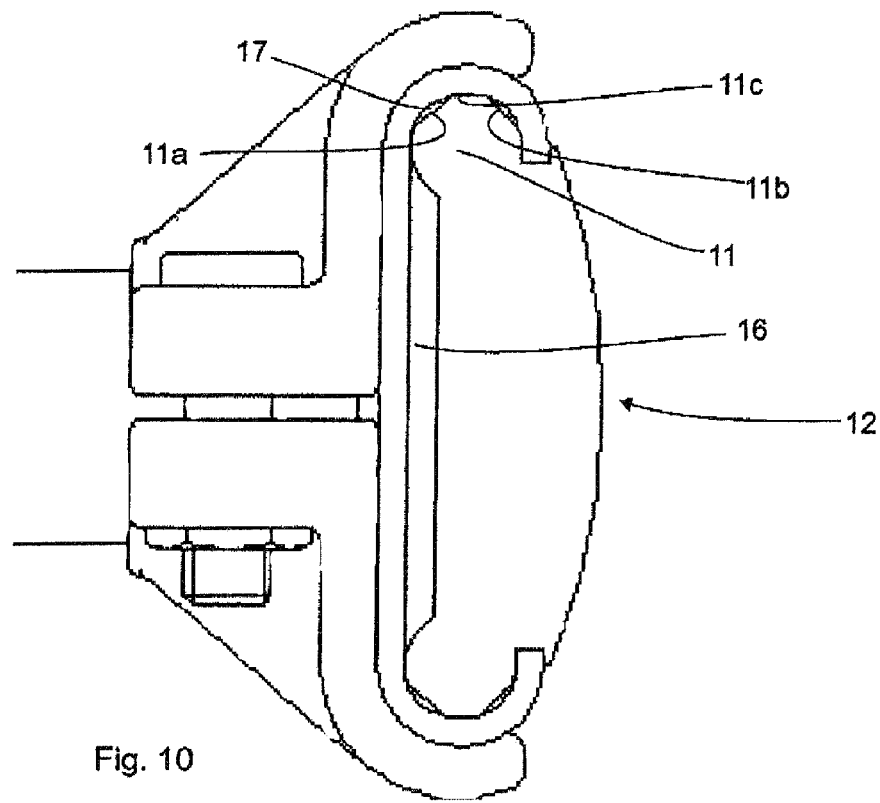
FIG. 10 shows an enlarged view of a further guide arrangement with an inserted guide element.

FIG. 10 shows a further embodiment of a guide element 4 with a guide device 12. Here too, the engagement means 11 have the side sections 11a and 11b and also the end section 11c, and here too the free areas 17 are formed between the guide device 12 and the guide element 4. The gap 16 between the guide device 12 and the guide element 4 can also clearly be seen in FIG. 10.

All of the features disclosed in the application documents are claimed as essential to the invention in so far as they are novel individually or in combination with respect to the prior art.

The invention claimed is:

1. A guide arrangement for guiding moving containers, comprising at least one guide element which extends in a predefined extension direction (E) at least in some sections along the transport path of the containers, and at least one holding device which holds the guide element at a predetermined position relative to the transport path, wherein the holding device has a clamp element which clamps the guide element, the clamp element bears against the guide element in a direction perpendicular to the extension direction (E), and the guide element has in its cross-section two holding sections and a wall section which is formed between these holding sections and in one piece with these holding sections, wherein these holding sections are curved at least by 90° and an outer circumference of the holding sections is in contact with the clamp element at least in some sections, wherein the clamp element and the guide element have a C-shaped profile, and the guide element has a recess which is formed by the wall section and the holding sections and in which a further guide device can be received, wherein the guide element can be introduced into the clamp element both in such a way that the recess projects in the direction of the containers to be conveyed and in such a way that the recess projects away from the containers.

2. The guide arrangement according to claim 1, wherein the holding sections have a curvature of more than 120°.

3. The guide arrangement according to claim 1, wherein the holding sections have a curvature of more than 140°.

4. The guide arrangement according to claim 1, wherein the holding sections have a curvature in a range of 160°-180°.

5. The guide arrangement according to claim 1, wherein the wall section runs in one plane and extends in an extension direction (E) of the guide element.

6. The guide arrangement according to claim 1, wherein the wall section is used directly as a railing for piece goods.

7. The guide arrangement according to claim 1, wherein the further guide device is inserted in the recess in the form of a plastic profile.

8. The guide arrangement according to claim 1, wherein the further guide device engages behind at least the two holding sections.

* * * * *